Patented Dec. 5, 1950

2,533,193

UNITED STATES PATENT OFFICE 2,533,193

2.3-DERIVATIVES OF 1.4-DIHALOANTHRAQUINONES

Fritz Max, Easton, Pa., and David I. Randall, Phillipsburg, N. J., assignors to General Aniline & Film Corporation, New York, N. Y., a corporation of Delaware No Drawing. Application April 3, 1947, Serial No. 739,250

2 Claims. (Cl. 260—376)

The present invention relates to 1.4-dihalo-2.3-dimethyl and dicarboxyanthraquinones and more particularly to the 1.4-dichloro compounds.

A very valuable group of vat dyes are those of the acridone and thioxanthone series. It has been proposed in the past to produce such dyes by the reaction of 1-halo-anthraquinones with anthranilic acid or thiosalicylic acid. For the most part dyestuffs of these series have been rather simply constituted primarily for the reason that substituted anthranilic and salicylic acids necessary for the preparation of the more complex dyestuffs are not readily available.

It has now been ascertained that complex dyestuffs of the acridone and thioxanthone series can be readily prepared from 1.4-dihalo-2.3-dicarboxyanthraquinones by reacting the same with substituted aromatic thiols and amines. It has likewise been discovered that the 1.4-dihalo-2.3-dicarboxyanthraquinones may be very easily prepared by oxidation from 1.4-dihalo-2.3-dimethylanthraquinones. Said 1.4-dihalo-2.3-dimethyl and dicarboxyanthraquinones and their preparation constitute the purposes and objects of the present invention.

The compounds contemplated by the present invention have the following structural formula wherein both Ys have the same value and are either methyl or carboxy:

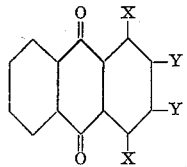

and X is halogen, such as, chlorine or bromine and preferably is chlorine.

The 1.4 - dihalo - 2.3 - dimethylanthraquinones falling within the above formula are conveniently prepared by reacting 2.3-dimethylanthraquinone with sulfuryl chloride in an inert solvent, such as, toluene, nitrobenzene and the like at a temperature of about 80 to 120° C. Similarly, the halogenation of the 2.3-dimethylanthraquinone may be effected with a mixture of chlorine or bromine in sulfuric acid or chlorsulfonic acid at a temperature ranging from 0 to 50° C. The 2.3-dimethylanthraquinone which may be prepared by condensing 2.3-dimethylbutadiene with α-naphthoquinone is described in Vol. 36, page 3171[4] of Chemical Abstracts.

1.4-dihalo-2.3-dicarboxylic anthraquinones are prepared by oxidizing the 1.4-dihalo-2.3-dimethylanthraquinones with nitric acid or a mixture of manganese dioxide and sulfuric acid. It is preferable to effect the reaction in a closed vessel at a temperature ranging from about 180 to 220° C.

Both the 1.4-dihalo-2.3-dimethylanthraquinones and the corresponding 2.3-dicarboxylic acids are capable of undergoing many different chemical reactions leading to valuable intermediates for the preparation of dyes and other dye intermediates. Thus, both can be reduced to the corresponding hydroquinone. They can also be sulfonated, nitrated, halogenated, esterified and aminated with ammonia and aliphatic and aromatic amines. The dicarboxylic acid derivatives may also be amidated with ammonia and the aforementioned amines. The 1.4-dihalo-2.3-dimethylanthraquinones are particularly valuable as intermediates for the preparation of benzanthrone by reaction with glycerol. On the other hand, the chief use of the corresponding 2.3-dicarboxy derivatives is as previously stated in the preparation of dyestuffs of the acridone and thioxanthone series.

The invention is further explained by the following examples but it is to be understood that these examples are illustrative and not limitative:

Example I 49.2 parts of 2.3-dimethylanthraquinone are added to a solution of 75 parts of sulfuryl chloride and 5 parts of iodine in 150 parts of nitrobenzene. The mixture was heated at 90 to 100° C. for five hours during which time the 1.4-dichloro-2.3-dimethylanthraquinone precipitated from the hot reaction mixture. Upon cooling the mixture to 10° C. there were obtained 41.5 parts of pure 1.4-dichloro-2.3-dimethylanthraquinone melting at 231 to 234° C.

Example II 12 parts of the 1.4-dichloro-2.3-dimethylanthraquinone obtained as in Example I and 75 parts of 20% nitric acid are heated to 200° C. in a pressure vessel for six hours. The yellow crystalline solid obtained was dissolved in dilute sodium hydroxide maintained at 60° C., the solution filtered and the product recovered by acidification with hydrochloric acid, followed by filtration. There were obtained 9 parts of 1.4-dichloro-2.3-dicarboxyanthraquinone melting at about 320° C.

Various modifications of the invention will be apparent to persons skilled in the art and we, accordingly, do not intend to be limited in the patent granted except as necessitated by the prior art and the appended claims.

We claim:
1. Compounds of the following formula:

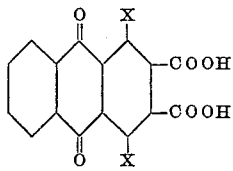

in which both Xs are the same and are selected from the class consisting of chlorine and bromine.

2. 1.4-dichloro-2.3-dicarboxyanthraquinone.

FRITZ MAX.
DAVID I. RANDALL.

REFERENCES CITED

The following references are of record in the file of this patent:

UNITED STATES PATENTS

| Number | Name | Date |
|---|---|---|
| 1,895,100 | Kranzlein et al. | Jan. 24, 1933 |
| 1,957,084 | Stein | May 1, 1934 |
| 1,966,126 | Kranzlein et al. | July 10, 1934 |

OTHER REFERENCES

Scholl et al., "Ber. deutsch. Chem. Ges.," vol. 65 (1932), pages 1405–1406.

Scholl et al., "Ber. deutsch. Chem. Ges.," vol. 67 (1934), pages 1746–1749.

Fieser et al., "J. Am. Chem. Soc.," vol. 64 (1942), pages 917–921.